United States Patent [19]

Ono

[11] 3,874,692

[45] Apr. 1, 1975

[54] AIR-SUSPENSION SYSTEM FOR MOTOR VEHICLES

[75] Inventor: Hiroyuki Ono, Kariya, Japan

[73] Assignee: Aisin Seiki Kabushiki Kaisha, Kariya-shi, Aichi-ken, Japan

[22] Filed: Mar. 8, 1973

[21] Appl. No.: 339,345

Related U.S. Application Data

[62] Division of Ser. No. 96,167, Dec. 8, 1970, Pat. No. 3,736,003.

[30] Foreign Application Priority Data

Dec. 9, 1969  Japan................................ 44-98333
Oct. 20, 1970 Japan................................ 45-92568

[52] U.S. Cl. .......................... 280/124 F, 267/65 D
[51] Int. Cl. ............................................ B60g 11/26
[58] Field of Search ................ 280/124 F; 267/65 D

[56] References Cited
UNITED STATES PATENTS 2,862,726  12/1958  Bertsch ............................. 267/65 D
2,882,069  4/1959   Faiver ................................ 267/65 D

*Primary Examiner*—Philip Goodman
*Attorney, Agent, or Firm*—Holman & Stern

[57] ABSTRACT

A motor-vehicle suspension system incorporates a closed air circuit comprising a low-pressure tank, a first changeover valve, a compressor, a second changeover valve, a high-pressure tank, and a pneumatic device (an air spring or the like into which compressed air is supplied from the high-pressure tank). A first pressure-sensitive device is provided for preventing the compressor from pumping any more air away from the low-pressure tank into the high-pressure tank upon reduction in the pressure of the former tank, while a second pressure-sensitive device is provided for restarting the once-stopped pumping operation in the event of the reduction in the pressure of the latter tank which may be caused by air leakage. Simultaneously with this restarting of the compressor operation, a device for air replenishment becomes operative to cause the first and second changeover valves to cut off the above two tanks from the compressor. Atmospheric air is then permitted to flow into this compressor and thence back into the low-pressure tank, from which the air is pumped into the high-pressure tank by the same compressor.

2 Claims, 4 Drawing Figures

AIR-SUSPENSION SYSTEM FOR MOTOR VEHICLES

This is a divisional of application Ser. No. 96,167, filed Dec. 8, 1970, now U.S. Pat. No. 3,736,003.

BACKGROUND OF THE INVENTION

This invention relates to air-suspension systems for motor vehicles, and more particularly to a motor-vehicle suspension system in which means are provided for replenishment of the closed air circuit built in the system with atmospheric air.

A motor-vehicle air-suspension system, in general, may contain as most important components a high-pressure tank containing compressed air, pneumatic means (as hereinafter referred to by this term to designate various types of air spring or the like utilizing the elasticity of confined air as the energy medium), valve means responsive to change in the vehicle height, and a compressor. These components make up the so-called "open air circuit" in case the air charged into the compressor is supplied more or less directly from the atmosphere, and the "closed air circiut" in case the compressed air that has served its purpose in the pnueumatic means is recharged into the compressor.

According to the first mentioned "open air circuit" scheme, dust particles, moisture and other foreign matter are very likely to find their way into the circuit, and the compressor in use is almost inevitably overworked since it must feed the supplied atmospheric air directly into the high-pressure tank in properly compressed form. Another serious drawback to this scheme is its great energy loss due to the wasting away of the compressed air after it has expended its energy in the pneumatic means.

In the second mentioned "closed air circuit" scheme, on the other hand, the circuit must be replenished with atmospheric air in compensation for the inevitable leakage of air therefrom or, alternatively, must be initially furnished with extra stock of air within the circuit itself. This latter method of air supply is less common with the prior art suspension systems incorporating the closed air circuits due mostly to the limited volumes of air which can be kept in stock. The former method is far more popular because of its simplicity and economy, among other reasons, but has an inherent drawback in that, as in the above described "open air circuit" scheme, the compressor must feed the supplied atmospheric air directly into the high-pressure tank in properly compressed form.

The motor-vehicle suspension systems equipped with means for atmospheric air replenishment in accordance with the present invention are designed to eliminate the above described drawbacks accompanying known systems.

SUMMARY OF THE INVENTION

It is a principal object of the present invention to provide an air-suspension system for motor vehicles which incorporates a closed air ciicuit together with novel means for replenishment of the circuit with atmospheric air.

Another object of the invention is to provide an air-suspension system for motor vehicles wherein a compressor used in its closed air circuit is not liable to be overworked either in the normal operating condition of the system or in the event of replenishment of the circuit with atmospheric air.

Still another object of the invention is to provide an air-suspension system for motor vehicles capable of tolerating the leakage of a far greater amount of air out of its closed circuit than that which could be tolerated by prior art suspension systems of comparable design.

Yet another object of the invention is to provide an air-suspension system for motor vehicles wherein a compressor used in its closed air circuit is operated intermittently depending upon a difference between the pressures of two individual components of the circuit.

A feature of the invention resides in the means for atmospheric air replenishment of the closed air circuit of a suspension system for motor vehicles, wherein the atmospheric air replenished into the circuit is temporarily fed to a low-pressure tank by means of a compressor and thence into a high-pressure tank (which supplies its compressed air into the pneumatic means interposed in the circuit) via the same compressor, so that only one compressor is required for the two steps of compression of the atmospheric air carried out before it is received by the high-pressure tank.

These, together with the various ancillary objects and features of the present invention, which will become apparent as the following description proceeds, are attained by the air suspension systems illustrated by way of example in the accompanying drawings.

DETAILED DESCRIPTION OF THE INVENTION

Figure 1:
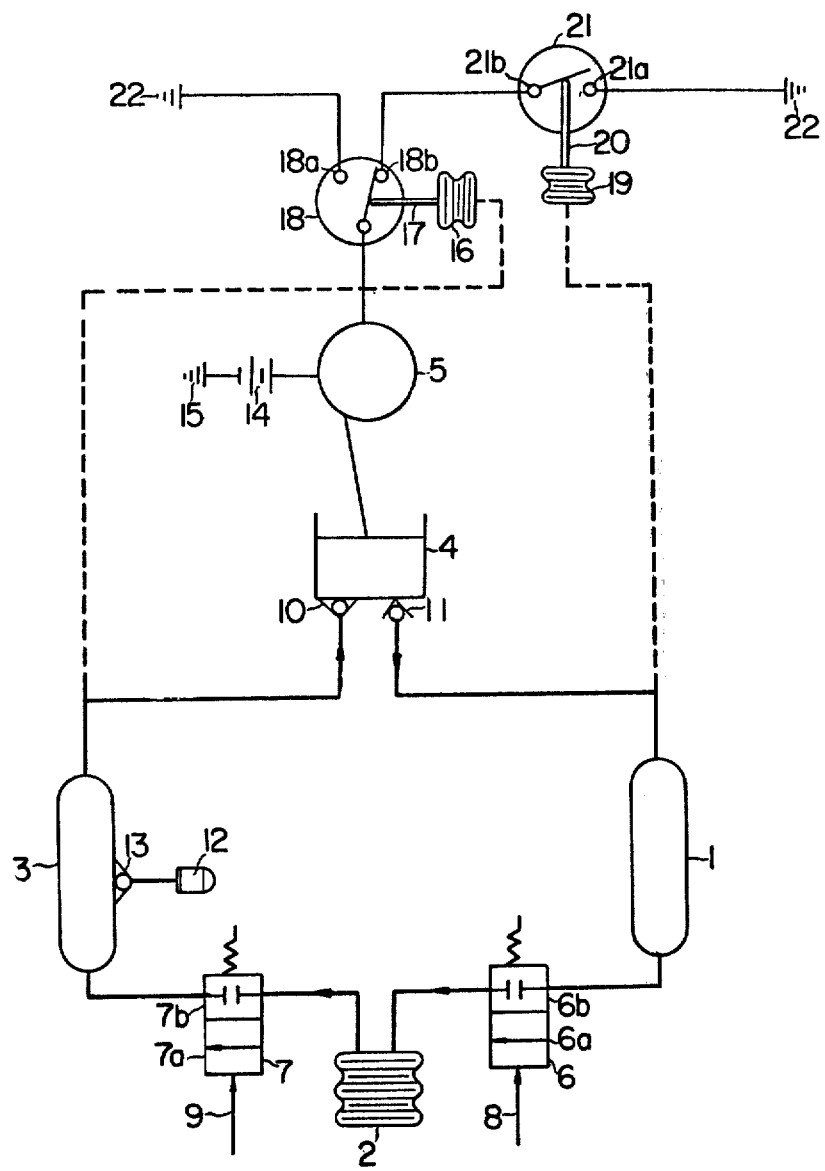
FIG. 1 is a schematic diagram showing the layout of a prior air-suspension system.

For further clarification of the problems left unsolved by the prior art and for better appreciation of the present invention itself, it is considered essential that a prior air suspension system of comparable design be shown and described in some detail before description is given on the preferred embodiments of the invention. Accordingly, referring firstly to FIG. 1 which schematically illustrates the layout of a prior motor-vehicle air-suspension system based upon the aforesaid "closed air circuit" scheme, reference numeral 1 indicates a high pressure tank, 2 pneumatic means, 3 a low pressure tank, 4 a compressor and 5 a motor adapted to drive the compressor 4.

The air circuit in this drawing (represented by the real lines) is further equipped with changeover valve means 6 and 7, the changeover valve means 6 keeping the pneumatic means 2 normally uncommunicated from the high-pressure tank 1 by means of its shut-off valve 6b and communicating the latter to the former through its release valve 6a only when applied with an external stimulus 8, and the other changeover valve means 7 similarly keeping the low-pressure tank 3 normally uncommunicated from the pnueumatic means 2 by means of its shut-off valve 7b and communicating the latter to the former through its release valve 7a only when applied with an external stimulus 9. The low-pressure tank 3 is provided with an atmospheric air intake 12 through a nonreturn valve 13, and the aforesaid compressor 4 is provided with a nonreturn inlet valve 10 and a nonreturn discharge valve 11.

Reference numberal 14 indicates a power supply for the motor 5, and 15 a grounding. A pressure-sensitive member 16, responsive to change in the pressure of the low pressure tank 3, is provided with an external projection 17 which is capable of rapidly moving the movable contact of a quick-action switch 18 between its contacts 18a and 18b (the snapping mechanism attendant to the quick-action switches being not illustrated in the drawings). Another pressure-sensitive member 19, responsive to change in the pressure of the high-pressure tank 1, also is provided with an external projection 20 which is capable of rapidly making and breaking the contacts 21a and 21b of a quick-action switch 21. Reference numeral 22 indicates groundings.

In the normal nonoperating condition of the closed air circuit of this prior air-suspension system, constituted of the high-pressure tank 1, the shutoff valve 6b, the pneumatic means 2, the shutoff valve 7b, the low-pressure tank 3, the nonreturn inlet valve 10, the compressor 4, and the nonreturn discharge valve 11, the pressure of the high-pressure tank 1 may be at its prescribed low level, the pressure of the pneumatic means 2 at its prescribed maximum level and the pressure of the low-pressure tank 3 at its prescribed minimum level.

When, in the above condition, the stimulus 8 is applied to the changeover valve means 6, the air of the high-pressure tank 1 is supplied to the pneumatic means 2. Succeedingly, upon application of the stimulus 9, the changeover valve means 7 is opened thereby to permit the discharge of the air of the pneumatic means 2 to the low-pressure tank 3. As the pressure of this low-pressure tank 3 builds up, the external projection 17 of the pressure-sensitive member 16 moves leftwardly in FIG. 1 and hence brings the movable contact of the quick-action switch 18 in touch with the contact 18a, thereby completing a circuit comprised of the grounding 15, the power supply 14, the motor 5, the contact 18a, and the grounding 22. Thereupon the compressor 4 becomes operative to pump the air away from the low-pressure tank 3 into the high-pressure tank 1. As the pressure of the low-pressure tank 3 drops gradually down to its prescribed minimum level, the movable contact of the quick-action switch 18 returns to the contact 18b.

If, at this instant, the pressure of the high-pressure tank 1 is at its prescribed minimum level (lower than its prescribed low level), the contacts 21a and 21b of the quick-action switch 21 will be brought together, thereby completing a circuit comprised of the grounding 15, the power supply 14, the motor 5, the contact 18b, the contacts 21b and 21a and the grounding 22. The compressor 4 will again become operative to further pump the air of Simultaneously, low-pressure tank 3 into the high-pressure tank 1. Simultaneloulsly, an alarm lamp, possibly installed somewhere between the quick-action switch 21 and the grounding 22, will light up to indicate the fact that the system is in a condition of air supply against leakage. The pressure of the low-pressure tank 3 is therefore bound to drop below its prescribed minimum level as long as the air is kept pumped away therefrom by the compressor 4.

When the high-pressure tank 1 attains its prescribed high-pressure level in due course, the contacts 21a and 21b of the quick-action switch 21 are separated by the external projection 20 of the pressure-sensitive member 19 thereby to stop the operation of the compressor 4. If the high-pressure tank 1 fails to do so even when the pressure of the low pressure tank 3 drops to that of the atmosphere, it further goes down slightly below the atmospheric pressure. Thereupon the nonreturn valve 13 opens to permit the flow of atmospheric air into the low-pressure tank 3 and thence into the high pressure tank 1 via the compressor 4, until the pressure of the high-pressure tank 1 reaches the prescribed high level and hence stops the operation of the motor 5 as described above.

It will now be obvious that, in the prior art suspension system described in the foregoing, the pressure of the low-pressure tank never fails to drop to the atmospheric pressure once atmospheric air is permitted to flow into it in order to compensate for the air that has leaked out of the system. The single compressor provided to this system is therefore virtually incapable of re-elevating the pressure of the high pressure tank to its prescribed high level of, for example, 10 kg/cm$^2$ or more; if not altogether incapable, the compressor will need highly involved extra means to accomplish this purpose. (This prior system will again be referred to at the end of the description on the second embodiment of the present invention.)

Figure 2:
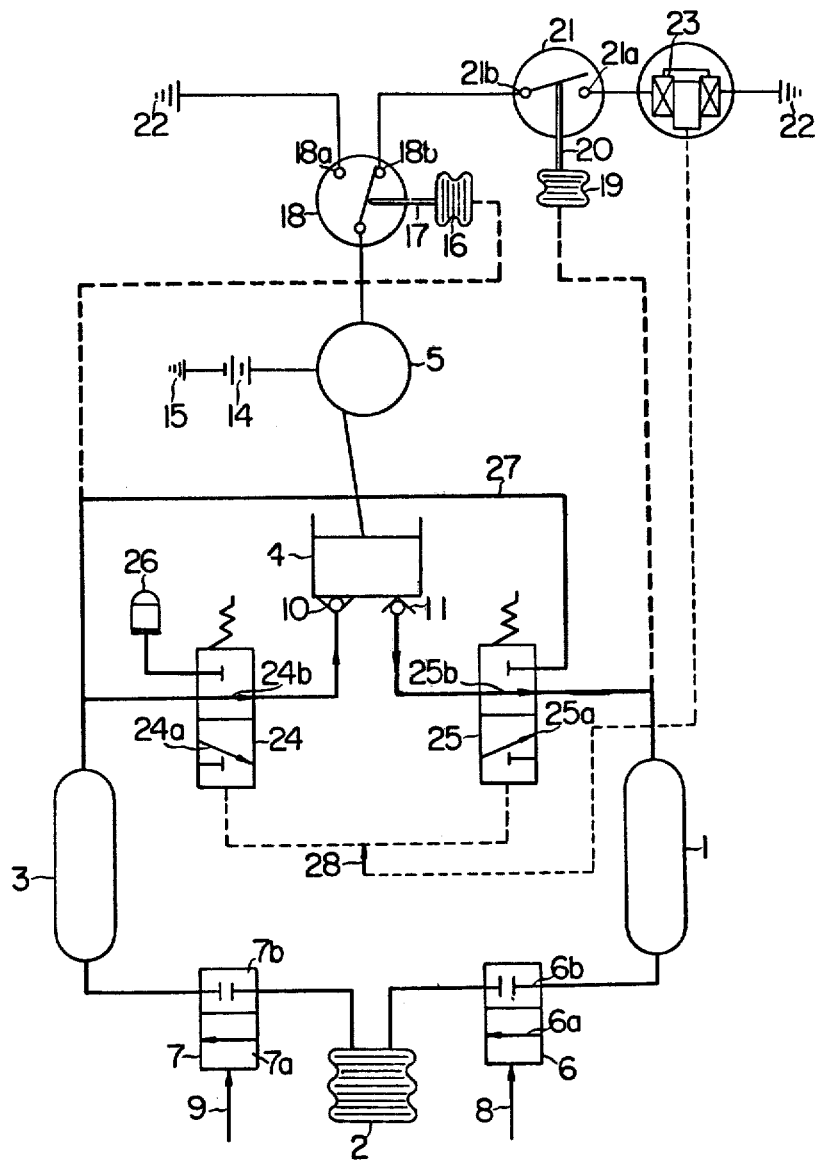
FIG. 2 is a schematic diagram showing the layout of a first air-suspension system in accordance with the present invention.

The motor vehicle air suspension system of the invention will now be described in detail in accordance wth its first embodiment illustrated schematically in FIG. 2. In this suspension system the following components have their substantially equivalent counter-parts in the prior system illustrated in FIG. 1 and hence carry the same reference characters: a high pressure tank 1, pneumatic means 2, a low pressure tank 3, a compressor 4, a motor 5, changeover valve means 6 and 7 (inclusive of their release valves 6b and 7b, and shut off valves 16b and 7b, as well as external stimuli 8 and 9), a nonreturn inlet valve 10, a nonreturn outlet valve 11, a motor-driving power supply 14, a grounding 15, pressure sensitive members 16 and 19, external projections 17 and 20, quick action switches 18 and 21 (inclusive of their contacts 18a, 18b, 21a and 21b) and groundings 21.

Additionally, electromagnet means 23 is provided which is associated with changeover valve means 24 and 25 as in the drawing. The changeover valve means 24 keeps the low pressure tank 3 normally communicated to the nonreturn inlet valve 10 of the compressor 4 through its passageway 24b and, only when electric current flows through the electromagnet means 23, communicates an atmospheric air intake 26 to the nonreturn inlet valve 10 through its passageway 24a. The changeover valve means 25, on the other hand, keeps the compressor 4 normally in communication with the high pressure tank 1 through its passageway 25b and, only when electric current flows through the electromagnet means 23, opens the other passageway 25a thereby to communicate the compressor 4 to the low pressure tank 3 through a conduit 27.

Consider now the closed air circuit in this first embodiment of the invention, the closed air circuit being constituted of the high pressure tank 1, the changeover valve means 6, the pneumatic means 2, the changeover valve means 7, the low pressure tank 3, the changeover valve means 24, the nonreturn inlet valve 10, the compressor 4, the nonreturn discharge valve 11 and the changeover valve means 25. In the normal nonoperating condition of this closed air circuit, the pressure of the means 2 may be at its prescribed maximum level, the pressure of the high pressure tank 1 at its prescribed low level and the pressure of the low pressure tank 3 at its prescribed minimum level.

When the shutoff valve 7b of the changeover valve means 7 is changed over to the release valve 7a upon application of the stimulus 9 thereto, the air of the pneumatic means 2 flows into the low-pressure tank 3. (The stimulus 9 may succeedingly be removed thereby to reclose the changeover valve means 7.) As the low-pressure tank 3 builds up its pressure, the external projection 17 of the pressure sensitive member 16 moves in the left hand direction in the drawing, thereby connecting the motor 5 to the contact 18a (instead of the contact 18b as in the drawing) of the quick-action switch 18.

Thereupon the compressor 4 begins its operation since then the electrical circuit is completed which incorporates the grounding 15, the power supply 14, the motor 5, the contact 18a and the grounding 22. The air of the low-pressure tank 3 is therefore pumped away into the high-pressure tank 1 until its pressure decreases gradually down to its prescribed minimum level, whereupon the movable contact of the quick action switch 18 returns to the contact 18b and hence stops the operation of the compressor 4. The pressure of the high-pressure tank 1 at this instant will be at its prescribed high level.

The stimulus 8 is succeedingly applied to the changeover valve means 6 thereby to permits the flow of air from the high-pressure tank 1 to the pneumatic means 2. (In this instance, too, the stimulus 8 may then be removed to reclose the changeover valve means 6.) The pneumatic means 2 will succeedingly attain its prescribed maximum pressure level, and the high-pressure tank 1 its prescribed low pressure level. However, since the pressure of the high-pressure tank 1 is then still higher than its prescribed minimum level, the quick action switch 21 is kept opened as in the drawing, so that the compressor 4 remains unoperative.

If the leakage of air out of the circuit does not occur, the above described cycle of operation will be reiterated. If it does, the air of the low-pressure tank 3 is supplied into the high-pressure tank 1 and thence into the pneumatic means 2, so that the pressure of the low-pressure tank 3 will drop to its prescribed minimum level whereas the pressure of the high-pressure tank 1 will drop below its prescribed low level. The movable contact of the quick action switch 18 is then brought to the contact 18b, and the quick action switch 21 is closed. The electrical circuit completed in this instance includes the grounding 15, the power supply 14, the motor 5, the contact 18b, the contacts 21b and 21a, the electromagnet means 23 and the grounding 22, so that the compressor 4 is again set in operation.

Simultaneously the flow of current to the electromagnet means 23 causes the same to influence (28) the changeover valve means 24 and 25 in such a manner that their passageways 24b and 25b are changed over to the passageways 24a and 25a, with the result that atmospheric air is permitted to flow from the atmospheric air intake 26 into the compressor 4 via its nonreturn inlet valve 10, while the air discharged from its nonreturn discharge valve 11 is made to flow into the low-pressure tank 3 (which has been at its prescribed minimum pressure level as mentioned above) through the conduit 27. The pressure of the low-pressure tank 3 then gradually builds up until the movable contact of the quick action switch 18 moves over from the contact 18b to the other contact 18a. Since the current flow to the electomagnet means 23 is then intercepted by this quick action switch 18, the changeover valve means 24 and 25 regain their initial conditions illustrated in FIG. 2.

A second embodiment of the present invention will now be described with reference to FIG. 3. The components making up the air circuit of this suspension system as well as the motor remain substantially unchanged from their counterparts in the previously described first embodiment of the invention and hence carry the same reference characters. A pressure-sensitive member 28 is to be operated by the difference between the pressures of a high-pressure tank 1 and a low-pressure tank 3. An external projection 29 provided to this pressure sensitive member 28 is made capable of rapidly bringing together and separating the contacts 30a and 30b of a quick-action switch 30. Another pressure-sensitive member 31 is responsive to change in the pressure of the low-pressure tank 3. An external projection 32 also provided to this pressure sensitive member 15 is made capable of rapidly bringing together and separating the contacts 33a and 33b of a quick-action switch 33. Electromagnet means 34 is made capable of simultaneously influencing (35) the changeover valve means 24 and 25, as mentioned already with connection to the first embodiment of the invention. Undue reduction in the amount of air present in this system is indicated by means of an alarm lamp 36. The contacts 38a and 38b of a quick-action switch 38 are rapidly brought together upon flow of current to a relay 37. A power supply 39 is provided for driving the motor 5. The remaining reference numerals 40, 41 and 42 indicate grounding.

The operation of this second air-suspension system in accordance with the present invention is described hereinbelow with reference to FIGS. 3 and 4.

Figure 4:
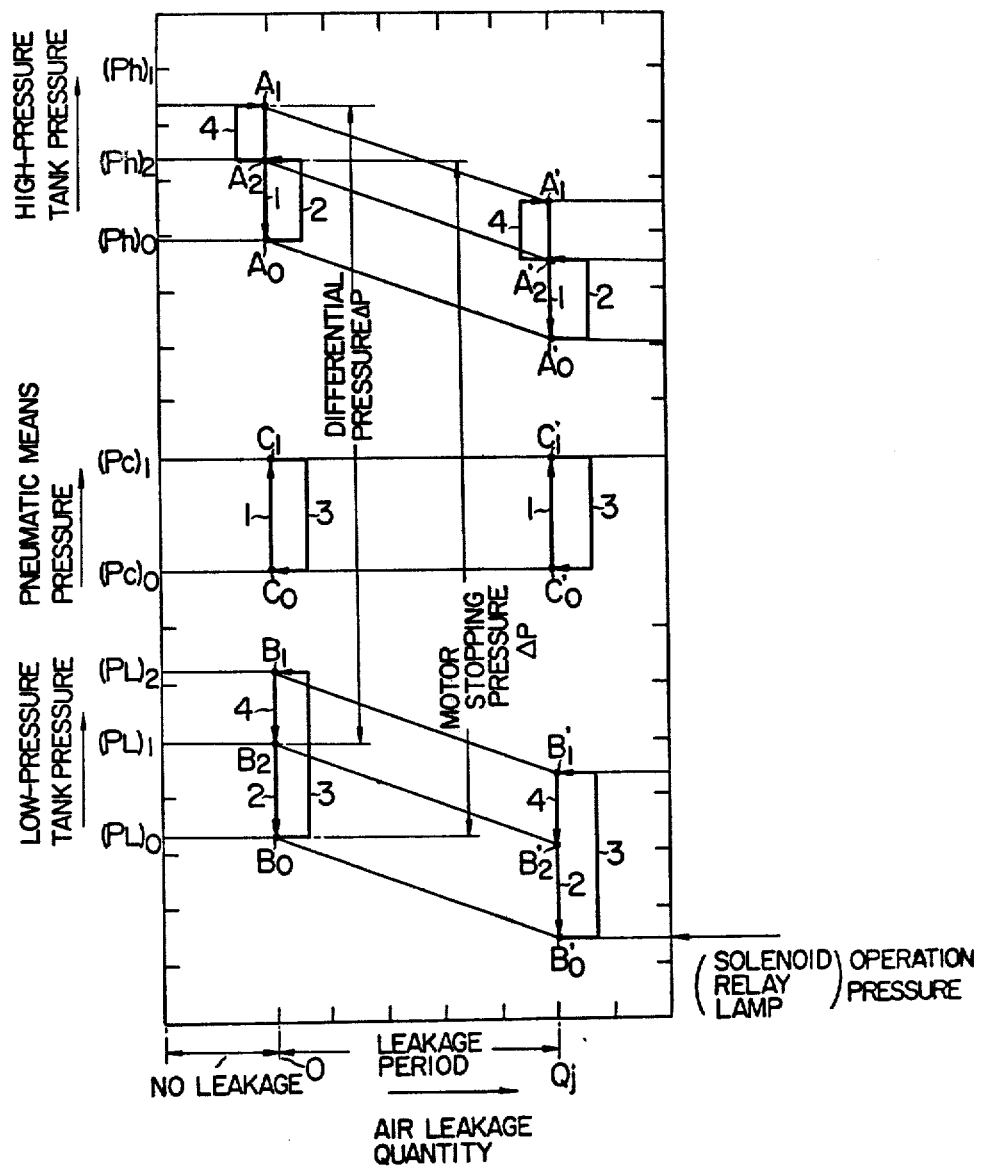
FIG. 4 is a graphical representation of changes in the pressures of some primary working components of the air-suspension system of FIG. 3.

Referring first to FIG. 4 which graphically represents the pressures of the high-pressure tank 1, the pneumatic means 2 and the low-pressure tank 3 versus the amount of air leaking out of the closed air circuit of the system, lines $\overline{A_1A_1}$, $\overline{A_2A_2}$, and $\overline{A_0A_0'}$ therein represent variations in the prescribed high, intermediate and low pressures, respectively, of the high-pressure tank 1 depending upon the amount of the leaking air. Lines $\overline{C_1C_1'}$ and $\overline{C_0C_0'}$ represent the prescribed high and low pressures, respectively, of the pneumatic means 2, remaining unvaried regardless of the amount of the leaking air. And lines $\overline{B_1B_1'}$, $\overline{B_2B_2'}$ and $\overline{B_0B_0'}$ represent variations in the prescribed high, intermediate and low pressures, respectively, of the low-pressure tank 3 depending upon the amount of the leaking air. The rectangular frames drawn by arrows in the same drawing represent the conditions of the pressures of the high pressure tank 1, the pneumatic means 2 and the low pressure tank 3 at the instants when the amount of the air that has leaked out of the system is O and Qj.

Referring back to FIG. 3, consider the closed air circuit comprised of the high-pressure tank 1, the changeover valve means 6, the pneumatic means 2, the changeover valve means 7, the low pressure tank 3, the changeover valve means 24, the nonreturn inlet valve 10, the compressor 4, the nonreturn discharge valve 11 and the changeover valve means 25. In the normal non-operating condition of this closed air circuit, the pressure of the high-pressure tank 1 may be at its prescribed high level (on the line $\overline{A_1A_1'}$ in FIG. 4), the pressure of the pneumatic means 2 at its prescribed low level (on the line $\overline{C_0C_0'}$ in FIG. 4) and the pressure of the low-pressure tank 3 at its prescribed intermediate level (on the line $\overline{B_2B_2'}$ in FIG. 4). These pressures of the high-pressure tank 1, the pneumatic means 2 and the low-pressure tank 3 will be respectively represented by the points $A_1$, $C_0$ and $B_2$ when the amount of leaking air is zero, and by the points $A_1'$, $C_0'$ and $B_2'$ when the amount of Qj. A difference $\Delta P$ between the pressures of the high pressure tank 1 and the low pressure tank 3 is the pressure whereby the contacts 30a and 30b of the quick-action switch 30 are separated, with the result that the motor 5 is kept out of motion.

When, in the above described condition, the stimulus 8 is applied to the changeover valve means 6, the air of the high pressure tank 1 is supplied to the pneumatic means 2. (The stimulus 8 may succeedingly be removed thereby to reclose the changeover valve means 6.) As the difference between the pressures of the high pressure tank 1 and the low pressure tank 3 grows smaller than the predetermined $\Delta P$ by decrease in the pressure of the former, the external projection 29 of the pressure sensitive member 28 in FIG. 3 moves in the left hand direction from its initial condition shown in the drawing, thereby bringing the contact 30b of the quick-action switch 30 in touch with the other contact 30a. This closure of the quick-action switch 30 sets the compressor 4 in motion as it is then connected with the grounding 40, the power supply 39, the contact 30a, the motor 5 and the grounding 41, with the result that the air of the low-pressure tank 3 is pumped to the high-pressure tank 1 via the passageway 24b of the changeover valve means 24, the nonreturn inlet valve 10, the compressor 4, the nonreturn discharge valve 11 and the passageway 25b of the changeover valve means 25.

The pressure changes with regard to the high-pressure tank 1, the pneumatic means 2 and the low-pressure tank 3 described in the foregoing paragraph are represented by the arrows 1 and 2 in the graph of FIG. 4. The aforesaid pumping of the air from the low-pressure tank 3 to the high-pressure tank 1 is carried out until the difference between the pressures of these tanks 1 and 3 reaches $\Delta P$, whereupon the contact 30b of the quick action switch 30 is separated from the contact 30a thereby to stop the operation of the motor 5 and hence the compressor 4.

Figure 3:
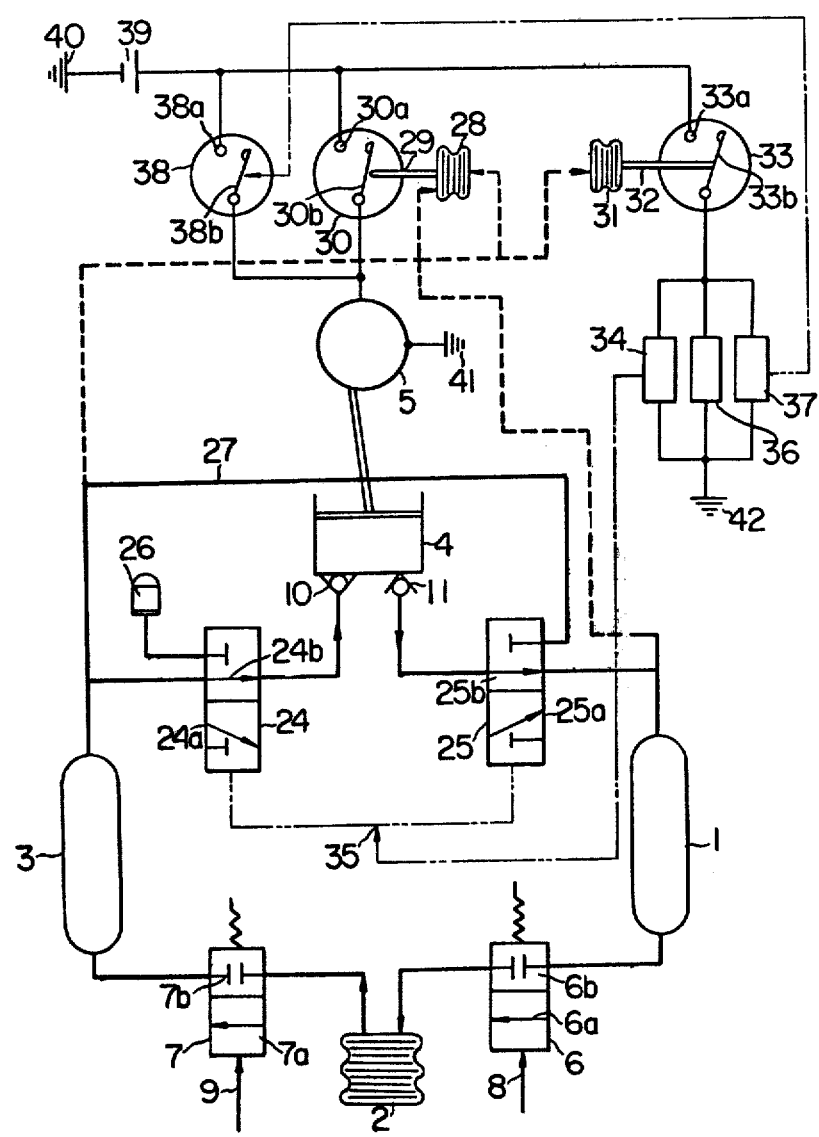
FIG. 3 also is a schematic diagram showing the layout of a second air-suspension system in accordance with the present invention.

Suppose now that the changeover valve means 7 of FIG. 3 is opened upon application of the stimulus 9, with the result that the air of the pneumatic means 2 is supplied to the low-pressure tank 3. (The stimulus 9 may succeedingly be removed thereby to reclose the changeover valve means 7.) Since the difference between the pressures of the high-pressure tank 1 and the low-pressure tank 3 succeedingly grows smaller than the predetermined $\Delta P$ in this instance, too, the contact 30b of the quick action switch 30 is brought in touch with the other contact 30a thereby to initiate the operation of the motor 5 and hence the compressor 4, which pumps the air away from the low-pressure tank 3 into the high-pressure tank 1 until the pressure difference therebetween reaches $\Delta P$.

The pressure changes described in the foregoing paragraph are represented by the arrows 3 and 4 in the graph of FIG. 4.

As increased air leakage out of the circuit reduces the pressures of both the high-pressure tank 1 and the low-pressure tank 3, the circuit will stand in need of air replenishment in the course of time. This need is satisfied as the pressure of the low-pressure tank three drops as far down as the point $B_u'$ along the line $\overline{B_0B_0'}$ representing its prescribed low-pressure level in the graph of FIG. 4, whereupon the external projection 32 of the pressure-sensitive member 31 in FIG. 3 moves leftwardly from its illustrated condition thereby to bring the contact 33b of the quick action switch 33 in touch with the other contact 33a and hence to permit the flow of electric current from the power supply 39 to the electromagnet means 34, the alarm lamp 36, and the relay 37.

When this current flows to the relay 37, the quick-action switch 38 has its contacts 38a and 38b rapidly brought together, so that the compressor 4 is immediately set in motion since then the electrical circuit is completed which incorporates the grounding 40, the power supply 39, the switch 38 (the contacts 38a and 38b), the motor 5 and the grounding 41. The flow of current to the electomagnet means 34, on the other hand, causes the changeover valve means 24 and 25 to open their passageways 24a and 25a (instead of the passageways 24b and 25b as illustrated in FIG. 3), with the result that atmospheric air is supplied to the low-pressure tank 3 since then the pneumatic circuit is completed which comprises the atmospheric air intake 26, the passageway 24a, the nonreturn inlet valve 10, the compressor 4, the nonreturn discharge valve 11, the passageway 25a, the conduit 27 and the low-pressure tank 3. Further the alarm lamp 36 lights up to exhibit the start of the atmospheric air supply into the circuit.

While the contacts 33a and 33b of the quick-action switch 33 are separated automatically by the external projection 32 of the pressure sensitive member 31 as the pressure of the low-pressure tank 3 builds up as above, there may, of course, be contemplated the utilization of the so-called hysteresis effect in order to make sure that sufficient supply of atmospheric air has been introduced into circuit at the moment of the separation of the contacts 33a and 33b. Upon separation of these contacts, the flow of current to the electromagnet means 34, the alarm lamp 36 and the relay 37 is intercepted.

As a result, the changeover valve means 24 and 25 regain their conditions illustrated in FIG. 3, the alarm lamp 36 goes off, and the contacts 38a and 38b of the quick-action switch 38 separate. However, since the pressure of the low-pressure tank 3 has built up to the desired level as above, the contact 30b of the quick action switch 30 is brought in touch with the other contact 30a thereof by the external projection 29 of the pressure-sensitive member 28 so that the air of the low-pressure tank 3 is pumped to the high-pressure tank 1 by means of the compressor 4. The motor 5 thus keeps the compressor 4 in motion until it is stopped at the instant when the difference between the pressures of the both tanks 1 and 3 reaches $\Delta P$.

As may be seen from the foregoing description of the operation of this second motor-vehicle air-suspension system in accordance with the present invention, the maximum quantity Q of air whose leakage out of the system is tolerated is defined by $$Q = \left\{(P_H)_1 - (P_H)'_1\right\}(V_H + V_L) \quad (1)$$

or $$Q = \left\{(P_L)_1 - (P_L)'_1\right\}(V_H + V_L) \quad (1)'$$

where $V_H$ is the capacity of the high-pressure tank 1, $V_L$ is the capacity of the low-pressure tank 3, $(P_H)_1$ is the starting pressure of the high-pressure tank 1, $(P_H)'_1$ is the pressure of the high-pressure tank 1 at the instant when the amount of air that has leaked out of the system is equal to Q, $(P_L)_1$ is the starting pressure of the low-pressure tank 3 and $(P_L)'_1$ is the pressure of the low-pressure tank 3 at the instant when the amount of air that has leaked out of the system is equal to Q.

In contrast, the corresponding maximum quantity Q' tolerated by the prior art motor-vehicle air-suspension system described previously and illustrated in FIG. 1 of the accompanying drawings may be defined by $$Q' = \left\{(P_H)_1 - (P_H)'_1\right\}V_H \quad (2)$$

A comparison between this expression (2) and the foregoing expression (1) or (1)' will clearly demonstrate the fact that, assuming the same starting and alarm-causing pressure conditions and the limited capacities for the high and low pressure tanks in use, the leakage of a far greater amount of air is tolerated by this second embodiment of the present invention.

Although some preferred forms of the air-suspension system of the invention have been shown and described in the foregoing, it is assumed that the invention itself is not to be restricted thereby but includes obvious and reasonable equivalents within its scope.

I claim:

1. An air-suspension system for motor vehicles, comprising a low-pressure tank, a high-pressure tank, means providing communication between the tanks, a compressor for supplying compressed air from the low-pressure tank to the high-pressure tank, and a pneumatic means for communication with the low- and high-pressure tanks, said high-pressure tank supplying the compressed air to the pneumatic means as required, which then utilizes the elasticity of the compressed air confined therein as the energy medium and thereafter feeds the air back to said low pressure tank, a first pressure-sensitive means operably related to said low-pressure tank, said first pressuresensitive means being operable in response to change in the pressure of the low-pressure tank in such a manner that the operation of said compressor is stopped thereby when the pressure reduction in said low-pressure tank reaches a prescribed level, a second pressure-sensitive means operably related to said high pressure tank and the compressor, said second pressure-sensitive means being operable in response to change in the pressure of said high-pressure tank in such manner that the operation of said compressor which has been stopped by said first pressure-sensitive means is restarted thereby when the pressure reduction in said high-pressure tank reaches a prescribed level, and means for air replenishment and becoming operative simultaneously with the operation of said second pressure-sensitive means thereby to change the communication of an inlet valve of said compressor over to an atmospheric air intake from said low-pressure tank and the communication of a discharge valve thereof over to said low-pressure tank from said high-pressure tank.

2. An air-suspension system for motor vehicles, comprising a low-pressure tank, a high-pressure tank, means providing communication between the tanks, a compressor for supplying compressed air from the low pressure tank to the high-pressure tank, and a pneumatic means for communicating with the low- and high-pressure tanks, said high pressure tank supplying the compressed air to the pneumatic means as required, which then utilizes the elasticity of the compressed air comfined therein as the energy medium and thereafter feeds the air back to the low-pressure tank, a first pressure-sensitive means operably related to the low-pressure tank and the compressor said first pressure-sensitive means being operable in response to change in the pressure of the low-pressure tank in such a manner that the operation of the compressor is stopped thereby when the pressure reduction in the low-pressure tank meets a prescribed level, a second pressure-sensitive means operably related to the high-pressure tank and the compressor, said second pressure-sensitive means being operable in response to change in the pressure of the high-pressure tank in such a manner that the operation of the compressor which has been stopped by the first pressure-sensitive means is restarted thereby when the pressure reduction in the high-pressure tank reaches a prescribed level, and means for air replenishment and becoming operative simultaneously with the operation of the second pressure-sensitive means thereby to change the communication of an inlet valve of the compressor over to an atmospheric air intake from the low-pressure tank and the communication of a discharge valve thereof over to the low-pressure tank from the high-pressure tank, said means for air replenishment comprising first changeover valve means installed between said low-pressure tank and said inlet valve of said compressor, second changeover valve means installed between said discharge valve of said compressor and said high-pressure tank, and electromagnet means energized upon operation of said second pressure-sensitive means so as to cause said first and said second changeover valve means to simultaneously modify their respective passageway.

* * * * *